United States Patent [19]
Hunt et al.

[11] Patent Number: 5,703,683
[45] Date of Patent: Dec. 30, 1997

[54] EXTRUDED WOBBLE PLATE OPTICAL ALIGNMENT DEVICE

[75] Inventors: William C. Hunt, Boulder; Torin T. Meyers, Thornton, both of Colo.

[73] Assignee: Ohmeda Inc., Liberty Corner, N.J.

[21] Appl. No.: 653,963

[22] Filed: May 28, 1996

[51] Int. Cl.[6] .............................. G01J 3/44; G02B 7/198; H01S 3/086
[52] U.S. Cl. .................... 356/301; 248/466; 248/487; 359/874; 372/107
[58] Field of Search .................... 356/301, 138; 372/107; 359/225, 224, 871, 872, 874, 876; 248/474, 476, 479, 485, 487, 495, 460

[56] References Cited

U.S. PATENT DOCUMENTS

| | | | |
|---|---|---|---|
| Re. 31,279 | 6/1983 | Mefferd et al. | 372/107 |
| Re. 34,153 | 12/1992 | Benner et al. | 356/301 |
| 3,229,224 | 1/1966 | Waly et al. | |
| 3,359,812 | 12/1967 | Everitt | 372/107 |
| 3,402,613 | 9/1968 | Neusel et al. | |
| 3,436,050 | 4/1969 | Tibbals, Jr. | 359/874 |
| 3,464,024 | 8/1969 | Bell et al. | |
| 3,484,715 | 12/1969 | Rempel | |
| 3,564,452 | 2/1971 | Rempel | 372/107 |
| 3,752,554 | 8/1973 | Thatcher | |
| 3,783,404 | 1/1974 | Matsuoka | |
| 3,826,998 | 7/1974 | Kindl et al. | |
| 3,864,029 | 2/1975 | Mohler | 372/107 |
| 3,953,113 | 4/1976 | Shull | 372/107 |
| 4,016,504 | 4/1977 | Klauminzer | |
| 4,298,248 | 11/1981 | Lapp | |
| 4,399,540 | 8/1983 | Bücher | |
| 4,414,460 | 11/1983 | Sudo et al. | |
| 4,442,524 | 4/1984 | Reeder et al. | 372/107 |
| 4,515,447 | 5/1985 | Weimer et al. | |
| 4,522,365 | 6/1985 | Tabares | 248/466 |

(List continued on next page.)

FOREIGN PATENT DOCUMENTS

| | | | |
|---|---|---|---|
| 59-204291 | 11/1984 | Japan | 372/107 |
| 63-70469 | 3/1988 | Japan | 372/107 |

OTHER PUBLICATIONS

NASA Tech Brief, Brief 66–10199, May 1966.

*Primary Examiner*—F. L. Evans
*Attorney, Agent, or Firm*—William A. Schoneman; Dennis H. Epperson; Salvatore P. Pace

[57] ABSTRACT

An optical alignment device comprised of two "H" shaped structures may be used to precisely position an optical element in two orthogonal directions. Each "H" shaped web structure includes two flanges extending from opposite ends of a center web having a centroidal flexure axis. The "H" shaped structures also each include an aperture extending through the flanges and the web. The center webs may be resiliently flexed, allowing the angle between the flanges of each "H" shaped structure to be adjusted by rotating screws fitted through one flange and threaded to the other. The "H" shaped structures are mounted together so that their flexure axes are orthogonally oriented with respect to each other and so that the apertures of each structure are aligned to form an optical path cavity. In an unflexed state, the flanges of each web structure are nonparallel, so that as the screws are rotated to bring the flanges towards a parallel relation, tension induced in the screws minimizes backlash between the screws and the corresponding web structure to securely hold the optical alignment device in the adjusted position. Alternatively, an equivalent state is obtained when the flanges are parallel in an unstressed state and the mounting surface for the optical device is machined non-parallel to the "H" shaped structures. The "H" shaped structures may be easily manufactured using standard molding or machining techniques, or by being extruded. In another aspect of the invention, the optical alignment device may be used in conjunction with a resonant optical cavity such as a Raman gas analysis system.

29 Claims, 6 Drawing Sheets

U.S. PATENT DOCUMENTS

| | | | |
|---|---|---|---|
| 4,638,486 | 1/1987 | Dost et al. | 372/107 |
| 4,672,626 | 6/1987 | Koseki | 372/107 |
| 4,674,097 | 6/1987 | Fountain | 372/107 |
| 4,680,771 | 7/1987 | Koseki | 372/107 |
| 4,784,486 | 11/1988 | Van Wagenen et al. | 356/301 |
| 4,796,275 | 1/1989 | Koop | 372/107 |
| 4,878,227 | 10/1989 | Ackermann et al. | 372/107 |
| 4,891,820 | 1/1990 | Rando et al. | 372/107 |
| 5,004,205 | 4/1991 | Brown et al. | 248/476 |
| 5,135,304 | 8/1992 | Miles et al. | 356/301 |
| 5,153,671 | 10/1992 | Miles | 356/301 |
| 5,245,405 | 9/1993 | Mitchell et al. | 356/301 |
| 5,411,235 | 5/1995 | Rumbaugh | 356/138 |

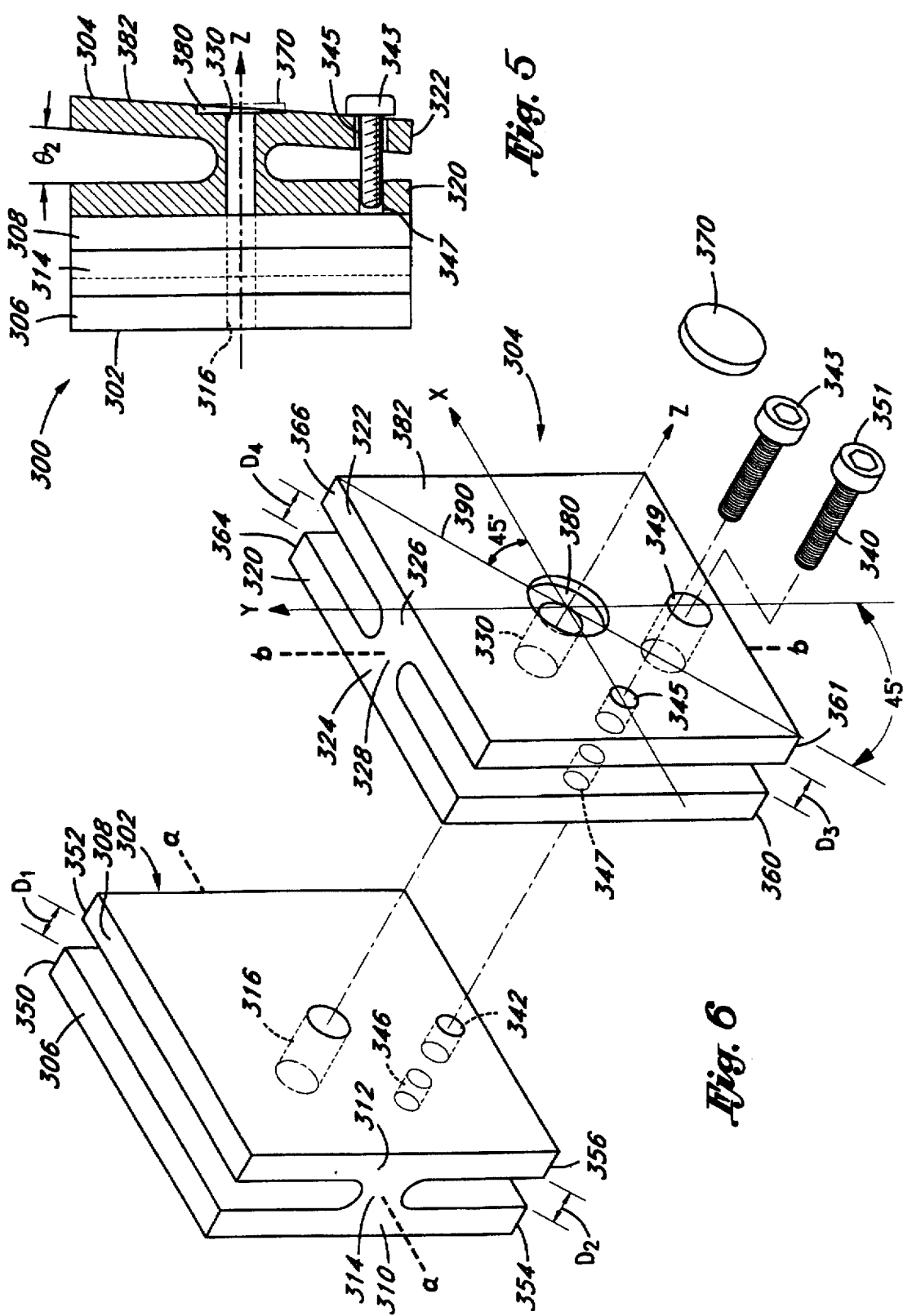

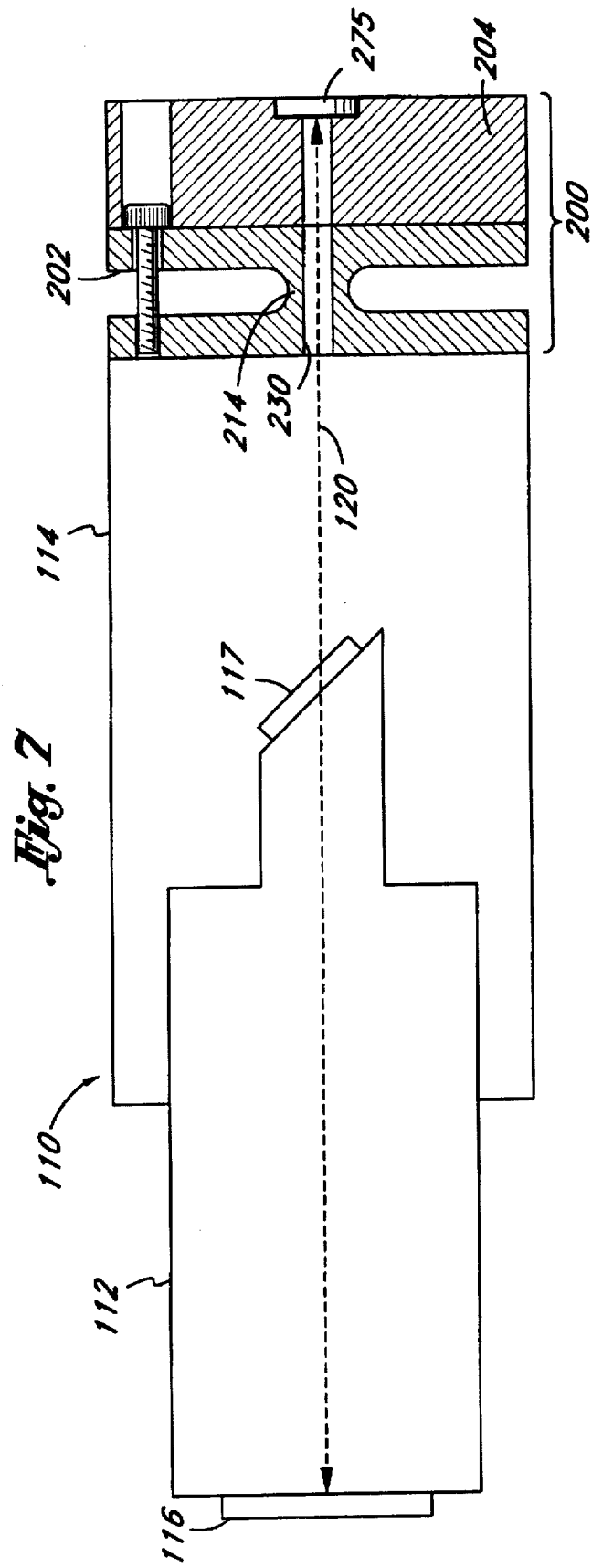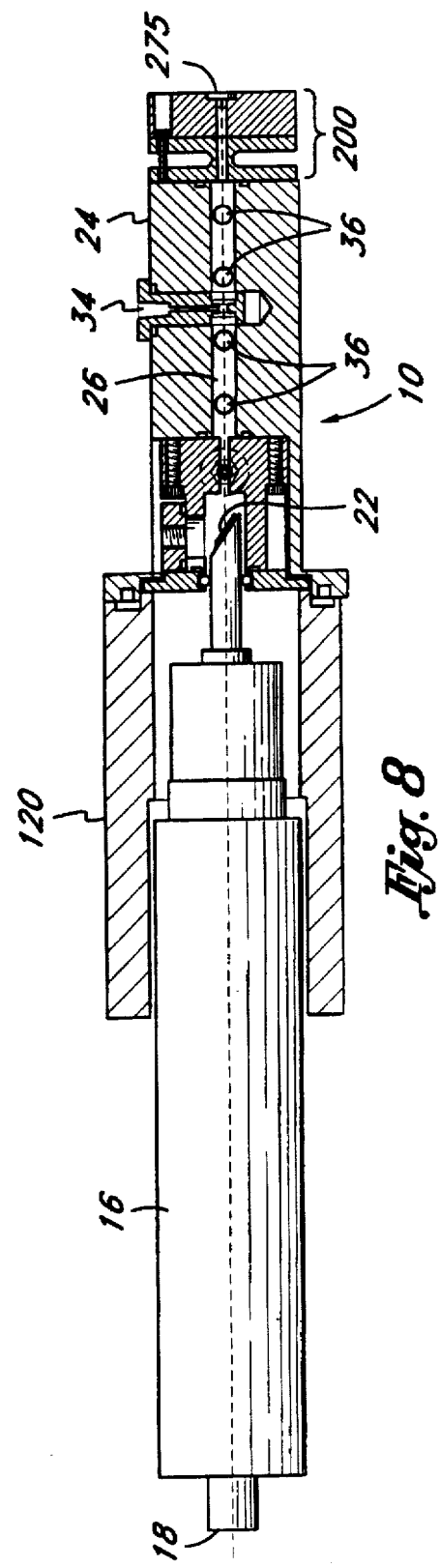

EXTRUDED WOBBLE PLATE OPTICAL ALIGNMENT DEVICE

FIELD OF THE INVENTION

The invention relates to an optical element positioning system, and more particularly to an optical element positioning system which may be used to align the optical elements in an optical cavity such as a laser-activated Raman light scattering gas analysis system.

BACKGROUND OF THE INVENTION

Raman light scattering has been successfully used in critical care situations to continuously monitor a patient's respiratory gases. This technique is based on the effect which occurs when monochromatic light interacts with vibrational/rotational modes of gas molecules to produce scattered light which is frequency shifted from that of the incident radiation by an amount corresponding to the vibrational/rotational energies of the scattering gas molecules. If the incident light photon loses energy in the collision, it is re-emitted as scattered light with lower energy and consequently lower frequency than the incident photon. In a similar manner, if the incident photon gains energy in the collision, it is re-emitted as scattered light with higher energy and higher frequency than the incident photon. Since these energy shifts are species-specific, analysis of the various frequency components present in the Raman scattering spectrum of a sample provides chemical identification of the gases present in the scattering volume. The intensity of the various frequency components, i.e., Raman spectral lines, provides quantification of the gases present, providing suitable calibrations have been made. In this manner, Raman light scattering can be employed to determine the identity and quantity of various respiratory and anesthetic gases present in a patient's breath in operating room and intensive care situations.

Systems developed for analysis of gases in critical care situations utilizing Raman scattering typically employ gas cells which contain a sample of the patient's respiratory gas to be analyzed. One such system is described in U.S. Pat. No. 4,784,486, entitled "MULTI-CHANNEL MOLECULAR GAS ANALYSIS BY LASER-ACTIVATED RAMAN LIGHT SCATTERING", issued to Van Wagehen et al. The gas cell is located either within the resonant cavity of a laser or outside the cavity. In an intracavity system, such as that described by Van Wagenen, a laser beam is directed through a resonant cavity such that it intercepts a respiratory gas sample within a gas cell. An end mirror located at one end of the resonant cavity redirects light incident from a plasma discharge tube back through the resonant cavity, where it again passes through the gas cell and back into the plasma discharge tube. A Brewster prism may be mounted near the end mirror to select the desired wavelength and polarization state of the lasing light. The end mirror and Brewster prism are both mounted on one or more plates of an alignment assembly. Raman scattered light from the gas analysis region within the gas cell is collected by collection optics and directed through one or more interference filters or other means of wavelength discrimination. The collection optics and interference filters and possibly focusing optics in turn transmit the Raman scattered light to appropriate detectors for quantifying each specific Raman signal and thus each specific gas comprising the respiratory gas sample.

Intracavity systems possess the advantage that they achieve a much greater Raman scattering intensity than systems in which the Raman scattering occurs outside of the laser resonant cavity. This greater intensity is a result of the fact that a laser beam transiting an intracavity arrangement propagates through the gas sample a great many times, with a correspondingly higher time-integrated intensity of Raman scattered light from the gas sample. In contrast, an external arrangement of the gas cell allows the laser beam only one pass through the gas sample. While intracavity systems benefit from a much greater Raman signal strength than do systems having the gas cell located outside the resonant cavity, the resonator optics must be positioned with extreme accuracy for this advantage to be realized, since the multiple reflection of the laser beam within the cavity magnifies any misalignment of the cavity end mirror. Consequently, the cavity end mirror, the Brewster prism (if present), and the central axis of the laser plasma tube must all be aligned almost perfectly with respect to each other at all times during operation of the gas analysis system. The alignment of the end mirror and associated prism is controlled by adjustment mechanisms on the alignment assembly on which the mirror is mounted.

In the intracavity gas cell systems discussed above, windows are commonly provided on either end of the gas cell to protect surrounding optical elements and filters from contaminants which may be present in the gas sample. The windows further serve to confine the gas sample within the gas cell, thereby minimizing the volume of the sample and thus improving the detector's response time. In some systems, the gas cell windows are oriented at Brewster's angle to select and improve the transmission of a particular polarization state of light passing through the sample. In this manner, optical losses in the laser beam which passes through the cell are minimized. However, the gas sample, in combination with particulates often carried with the sample, may contaminate the cell windows and degrade the performance of the system. This contamination may result in undesirable light absorption and/or scattering with a consequent decrease in the laser power circulating through the sample cell. If untreated, this contamination will eventually cause the system to cease to function properly.

The problem of window and cavity optics contamination has been partially solved by providing an air dam around the optics of the laser system to shield the optics from contaminated sample. Systems for providing such an air dam are disclosed in U.S. Pat. No. 5,135,304, entitled "GAS ANALYSIS SYSTEM HAVING BUFFER GAS INPUTS TO PROTECT ASSOCIATED OPTICAL ELEMENTS", issued to Miles et al. and U.S. Pat. No. 5,153,671, entitled "GAS ANALYSIS SYSTEM HAVING BUFFER GAS INPUTS TO PROTECT ASSOCIATED OPTICAL ELEMENTS", issued to Miles. In intracavity systems such as those disclosed in U.S. Pat. 5,135,304, the sample of gas to be analyzed is injected near the center of the array of detectors. Simultaneously, a buffer gas such as nitrogen or filtered air is injected on the sides of the analyzer cavity. Both gas streams are exhausted at an intermediate point. This system advantageously provides a pure gas sample near the detectors while protecting the optics of the resonant cavity from contamination. In spite of the advances made in protecting the resonant cavity optics from contamination, individual portions of the resonant cavity, including the end mirrors, gas cell and laser plasma tube, must still occasionally be disassembled and cleaned of contamination, repaired or replaced. At such times, the optical elements are disassembled and repaired or cleaned, then reassembled. The high degree of precision required of the optical alignment of the system, including the alignment of the end mirror, Brewster prism (if present), and plasma discharge tube, renders field repairs difficult. Thus, most repairs are presently made at the factory where the system can be placed on an optical bench or fixture for precision alignment of the components.

Many devices have been created to aid in the alignment of optical elements in general and for alignment of laser system components in particular. However, most of these devices suffer from one or more of the following disadvantages: 1) complex and hence expensive mechanisms; 2) low accuracy; 3) unstable, i.e., do not hold adjustment well over time; or 4) must be carefully realigned each time the system configuration is altered. For example, U.S. Pat. No. 4,442,524, entitled "MULTIPLE LEVER APPARATUS FOR POSITIONING AN OPTICAL ELEMENT", issued to Reeder et al. discloses a system for finely adjusting the relative angular orientation of a mirror assembly. This system employs a complex set of levers to reduce the amount of adjustment made by a single turn of each adjusting screw. This system is expensive to manufacture and appears to be unstable, i.e., would not hold an adjustment during temperature changes and may be sensitive to vibrations. U.S. Pat. No. 4,878,227, entitled "DEVICE FOR A MODULAR POWER LASER", issued to Ackermann et El. discloses a system wherein two plates are supported relative to each other with a "differential" thread adjustment screw arrangement. However, the "differential" thread of Ackermann is a combination of a right hand screw pitch in one plate and a left hand screw pitch in the other plate, connected by an adjustment screw having a right hand thread pitch on one end and a left hand thread pitch on the other end, each end having the same number, n, of threads per inch. A single turn of the adjustment screw changes the relative distance between the plates by 2/n inches. This is not suitable for precision adjustments, since the adjustment is too course.

Additional optical adjustment devices are disclosed in: U.S. Pat. No. 4,796,275, entitled "FLOATING MIRROR MOUNT", issued to Koop; U.S. Pat. No. 4,680,771, entitled "MIRROR ADJUSTMENT DEVICE IN LASER OSCILLATOR", issued to Koseki; U.S. Pat. No. 4,672,626, entitled "LASER Oscillator MIRROR ADJUSTMENT APPARATUS", issued to Koseki; U.S. Pat. No. 4,638,486, entitled "ADJUSTMENT DEVICE FOR A REFLECTOR MIRROR OF A LASER RESONATOR", issued to Dost et al.; U.S. Pat. No. 4,515,447, entitled "OPTICAL ADJUSTMENT DEVICE", issued to Weimer et al.; U.S. Pat. No. Re. 31,279, entitled "LASER OPTICAL RESONATOR", issued to Mefferd et al.; U.S. Pat. No. 3,864,029, entitled "LASER MIRROR MOUNT AND WINDOW PROTECTION ASSEMBLY", issued to Mohler; U.S. Pat. No. 3,564,452, entitled "LASER WITH STABLE RESONATOR", issued to Rempel; U.S. Pat. No. 3,484,715, entitled "TEMPERATURE COMPENSATING MOUNTING FOR LASER REFLECTORS", issued to Rempel; U.S. Pat. No. 3,359,812, entitled "ANGLE ADJUSTING MECHANISM FOR OPTICAL ELEMENTS", issued to Everitt; Japan Patent No. 63-70469(A), entitled "ADJUSTING DEVICE FOR RESONATOR MIRROR", issued to Mitsubishi; Japan Patent No. 59-204291 (A), entitled "LASER RESONATOR", issued to Nihon; and U.S. patent application Ser. No. 08/366, 840, entitled "RAMAN GAS ANALYSIS SYSTEM WITH PRECISION OPTICAL ALIGNMENT FEATURES"

In general, commonly used optical alignment devices are not suitable in several respects for a mass produced, field serviceable, robust, complex optical system, such as a Raman Gas Analysis system. Simple set screw mechanisms suffer from backlash between the threads and the securing bolt. Backlash allows the position of the element being adjusted to shift after the adjustment, necessitating the employment of biasing springs or other means to provide a constant pressure on the threads. More complex systems require precision alignment on an optical bench each time the system configuration is disturbed, either intentionally for repairs or unintentionally by environmental factors such as vibration and temperature changes. Thus, there exits a need for optical alignment device which is robust, easily and precisely aligned in the field, and which maintains its alignment once established. There is a further need for a precision optical alignment device that is simple to manufacture and assemble.

SUMMARY OF THE INVENTION

The present invention is used to orthogonally adjust optical components, for example mirrors. The invention includes a low cost assembly utilizing an extruded section which can be cut into substantially identical lengths wherein two of the substantially identical lengths are assembled at 90 degrees of rotation with respect to each other about an intended mirror alignment axis. This provides two degrees of freedom to obtain the angular adjustment in two planes.

In a first embodiment, the extruded sections include a thin web connecting two nearly parallel mounting surfaces. The entire section is extruded such that the mounting surfaces are a few degrees from parallel to provide a preload on the adjusting mechanism, for example screws, when the surfaces are adjusted parallel. The angle of non-parallelism includes the full range of required optical adjustment to ensure preload at all times.

In a second embodiment, the extruded mounting surfaces are substantially parallel and a mounting surface for the optical device to be adjusted is machined non-parallel to the extruded mounting surface in such a way as to require adjustment in two planes, (i.e., two orthogonal axes) to bring the optical device, mounted to the non-parallel mounting surface, into parallel alignment. The angle of non-parallelism of the optical mounting surface with respect to the extruded mounting surfaces is selected to include a full range of required optical adjustment and to ensure preload on the extruded mounting surfaces at all times.

In both embodiments, the web section is designed to limit bending in the plane of the mounted optical device. The web section is also placed between the extruded mounting surfaces in such a way as to limit translation of the optical device while providing angular adjustment. One piece of the extruded section can provide an angular adjustment by forcing angular movement about an axis along the web section of one mounting surface relative to the other. This generates elastic bending in the web for preload as the extruded mounting surfaces are displaced with respect to each other. The two lengths of extruded section are machined in such a way that one can be mounted to or through the other. A hole is machined through the two lengths to allow light to project onto the optical surface to be adjusted. In the assembly, one of the lengths is mounted with its web section rotated 90 degrees with respect to the web section of the other lengths such that the axes of the two web sections intersect substantially at the center of the holes machined through the two lengths. When two lengths are oriented in this way, two degrees of freedom of adjustment are provided and the orthogonal adjustment of the optical component can be accomplished.

In accordance with the first embodiment of the present invention, an optical alignment device is disclosed which overcomes the limitations of the prior art alignment systems described above. The optical alignment device is comprised of two "H" shaped structures which may be used to precisely position an optical element in two orthogonal directions.

Each "H" shaped web structure includes two flanges extending from opposite ends of a center web having a centroidal flexure axis. The "H" shaped structures also each include an aperture extending through the flanges and the web. The center webs may be resiliently flexed, allowing the angle between the flanges of each "H" shaped structure to be adjusted by rotating threaded elements, such as screws, fitted through one flange and threaded to the other. The "H" shaped structures are mounted together so that their flexure axes are orthogonally oriented with respect to each other and so that the apertures of each structure are aligned to form an optical path cavity. In an unflexed state, the flanges of each web structure are nonparallel, so that as the threaded elements are rotated to bring the flanges towards a parallel relation, compression induced in the screws minimizes backlash between the screws and the corresponding web structure to securely hold the optical alignment device in the adjusted position. The "H" shaped structures may be easily manufactured using standard molding or machining techniques, or by being extruded. An optical element mounted over the optical path cavity of the alignment device may be precisely positioned by suitably adjusting the threaded elements.

In accordance with the second embodiment of the present invention, an optical alignment device is disclosed which overcomes the limitations of the prior art alignment systems described above. The optical alignment device is comprised of two "H" shaped structures which may be used to precisely position an optical element in two orthogonal directions. Each "H" shaped web structure includes two flanges extending from opposite ends of a center web having a centroidal flexure axis. The "H" shaped structures also each include an aperture extending through the flanges and the web. The center webs may be resiliently flexed, allowing the angle between the flanges of each "H" shaped structure to be adjusted by rotating threaded elements, such as screws, fitted through one flange and threaded to the other. The "H" shaped structures are mounted together so that their flexure axes are orthogonally oriented with respect to each other and so that the apertures of each structure are aligned to form an optical path cavity. A mounting surface for the optical device to be adjusted is machined non-parallel to one of the flanges of one of the "H" shaped structures in such a way as to require adjustment in two planes, (i.e., two orthogonal axes) to bring the optical device, mounted to the non-parallel mounting surface, into parallel alignment. In an unflexed state, the flanges of each web structure are substantially parallel, so that as the threaded elements are rotated to bring the flanges towards a non-parallel relationship to compensate for the non-parallel optical device mounting surface, compression induced in the screws minimizes backlash between the screws and the corresponding web structure to securely hold the optical alignment device in the adjusted position. The "H" shaped structures may be easily manufactured using standard molding or machining techniques, or by being extruded. An optical element mounted over the optical path cavity of the alignment device may be precisely positioned by suitably adjusting the threaded elements.

In another aspect of the invention, the optical alignment device may be used in conjunction with a resonant optical cavity such as a Raman gas analysis system.

The precision optical alignment device of the present invention provides a simple, inexpensive, and rugged mechanism for precisely aligning an optical element in an optical system. Once established, the alignment provided by the present invention is substantially permanent as a result of tension induced in the threaded elements used to adjust the alignment. The ease and permanence with which the alignment may be effected advantageously allows repair operations on optical cavities and Raman analyzers to more easily be performed in the field, thereby minimizing the expense and delay associated with repair or cleaning of the optics of such systems.

A third embodiment of the present invention is an optical alignment device comprising: 1) a first "H" shaped web structure which comprises: first and second flanges extending from a first web having a first flexure axis; a first aperture extending through the first "H" shaped web structure; and a first adjusting element connecting the first and second flanges such that operation of the first adjusting element produces an angular displacement about the first flexure axis of the first flange with respect to the second flange; and 2) a second "H" shaped web structure which comprises: third and fourth flanges extending from a second web having a second flexure axis; a second aperture extending through the second "H" shaped web structure; and a second adjusting element connecting the third and fourth flanges such that operation of the second adjusting element produces an angular displacement about the second flexure axis of the third flange with respect to the fourth flange; wherein the first and second "H" shaped web structures are joined together such that the first and second flexure axes are substantially perpendicular and the first and second apertures are substantially aligned. In some embodiments, the first and second adjusting elements are screws. Additionally, the first and second flanges may define a first nonparallel angle when the first "H" shaped structure is in an unflexed state. The first nonparallel angle is typically in the range of from one to fifteen degrees. Furthermore, the third and fourth flanges may define a second nonparallel angle when the second "H" shaped structure is in an unflexed state. In some embodiments, the first and second "H" shaped structures are each monolithic structures. The first and second "H" shaped structures may also be substantially identical extruded structures. In some embodiments, the first and second adjusting elements are in tension. These embodiments may also include an optical element mounted to the first "H" shaped structure in optical alignment with the optical path cavity. In certain embodiments, the first and second flanges are substantially parallel when the first "H" shaped structure is in an unflexed state and one of the first or second flanges further includes an optical mounting surface which is non-parallel to the first and second flanges. Additionally, the third and fourth flanges may be substantially parallel when the second "H" shaped structure is in an unflexed state.

A fourth embodiment of the present invention is an optical alignment device comprising: 1) a first "H" shaped structure comprising: a first web having a first flexure axis and opposed first and second ends; a first flange resiliently extending from the first end of the first web and having a first threaded aperture; a second flange resiliently extending from the second end of the first web and having a second aperture coaxially aligned with the first threaded aperture; a third aperture extending through the first and second flanges and through the first web; and a first threaded member fitted through the second aperture and threaded to the first threaded aperture, whereby rotation of the first threaded member resiliently displaces the first flange with respect to the second flange; and 2) a second "H" shaped structure comprising: a second web having a second flexure axis and opposed third and fourth ends; a third flange resiliently extending from the third end of the second web, and having a fourth threaded aperture; a fourth flange resiliently extending from the fourth end of the second web, and having a fifth aperture coaxially aligned with the fourth threaded aperture; a sixth aperture extending through the third and fourth flanges and through the second web; and a second threaded member fitted through the fifth aperture and threaded to the fourth threaded aperture, whereby rotation of the second threaded member resiliently displaces the third flange with respect to the fourth flange; wherein the second "H" shaped structure is mounted to the first "H" structure so that the first and second flexure axes are substantially perpendicular and so that the third and sixth apertures are substantially aligned. In some embodiments, the first and second flanges define a nonparallel first angle therebetween when the first "H" shaped structure is in an unflexed state. The first angle is typically in the range of from one to fifteen degrees. Furthermore, the third and fourth flanges may define a nonparallel second angle therebetween when the second "H" shaped structure is in an unflexed state and the second angle is typically in the range of from one to fifteen degrees. The first and second threaded members may further comprise screws. In some embodiments, the first and second "H" shaped structures are each monolithic structures. Furthermore, the first and second "H" shaped structures may be extruded structures. These embodiments may further comprise an optical element mounted to the first "H" shaped structure and substantially optically aligned with the third aperture. In alternative embodiments, the first and second flanges are substantially parallel when the first "H" shaped structure is in an unflexed state and one of the first or second flanges further includes an optical mounting surface which is non-parallel to the first and second flanges. Additionally, the third and fourth flanges may be substantially parallel when the second "H" shaped structure is in an unflexed state.

In a fifth embodiment, the present invention is a Raman gas analysis system comprising: a plasma discharge tube having a first reflector at a first end; an optical alignment device which supports an optical element optically aligned with the first reflector, the optical alignment device further comprising: a first "H" shaped web structure including: first and second flanges extending from a first web having a first flexure axis; a first aperture extending through the first and second flanges and through the first web; and a first threaded element engaged with the first "H" shaped web structure so that rotating the first threaded element angularly displaces the first flange with respect to the second flange; and a second "H" shaped web structure including: third and fourth flanges extending from a second web having a second flexure axis; a second aperture extending through the third and fourth flanges and through the second web; and a second threaded element engaged with the second "H" shaped web structure so that rotating the second threaded element angularly displaces the third flange with respect to the fourth flange; wherein the first and second "H" shaped web structures are mounted together so that the first and second flexure axes are substantially perpendicular, and the first and second apertures are substantially aligned; and a gas analysis cell mounted between the plasma discharge tube and the optical alignment device. In this embodiment, the optical element may be a reflector.

In a sixth embodiment, the present invention is an optical alignment device comprising: 1) a first "H" shaped web structure comprising first and second flanges extending from a first web having a first flexure axis; and a first adjusting element connecting the first and second flanges such that operation of the first adjusting element produces an angular displacement about the first flexure axis of the first flange with respect to the second flange; 2) a second "H" shaped web structure comprising third and fourth flanges extending from a second web having a second flexure axis; and a second adjusting element connecting the third and fourth flanges such that operation of the second adjusting element produces an angular displacement about the second flexure axis of the third flange with respect to the fourth flange; wherein the first and second "H" shaped web structures are joined together such that the first and second flexure axes are substantially perpendicular. In some embodiments, the first and second flanges define a first nonparallel angle when the first "H" shaped structure is in an unflexed state and the third and fourth flanges define a second nonparallel angle when the second "H" shaped structure is in an unflexed state. The first and second "H" shaped structures may be substantially identical extruded structures. In other embodiments, the first and second flanges are substantially parallel when the first "H" shaped structure is in an unflexed state and one of the first or second flanges further includes an optical mounting surface which is non-parallel to the first and second flanges. Additionally, the third and fourth flanges may be substantially parallel when the second "H" shaped structure is in an unflexed state.

These and other advantages of the present invention will become apparent through reference to the following detailed description of the preferred embodiments and accompanying drawings.

BRIEF DESCRIPTION OF THE DRAWINGS

FIG. 5 illustrates a cross-section of the second embodiment of the optical alignment device of FIG. 4 taken along line 5—5.

FIG. 6 illustrates an exploded assembly view of the second embodiment of the optical alignment device shown in FIGS. 4 and 5.

FIG. 7 illustrates a laser resonant cavity including an optical element alignment device embodying various features of the present invention.

FIG. 8 illustrates a laser resonant cavity which includes a Raman gas analysis cell and an optical element alignment system embodying various features of the present invention.

Throughout the figures, like elements are referenced with like reference numbers.

DETAILED DESCRIPTION OF THE PREFERRED EMBODIMENTS

The present invention provides a precision optical alignment device for adjusting the position of an optical element mounted to the device. The invention provides a low cost, rugged, assembly having few components which is easy to manufacture and to adjust.

Figure 1:
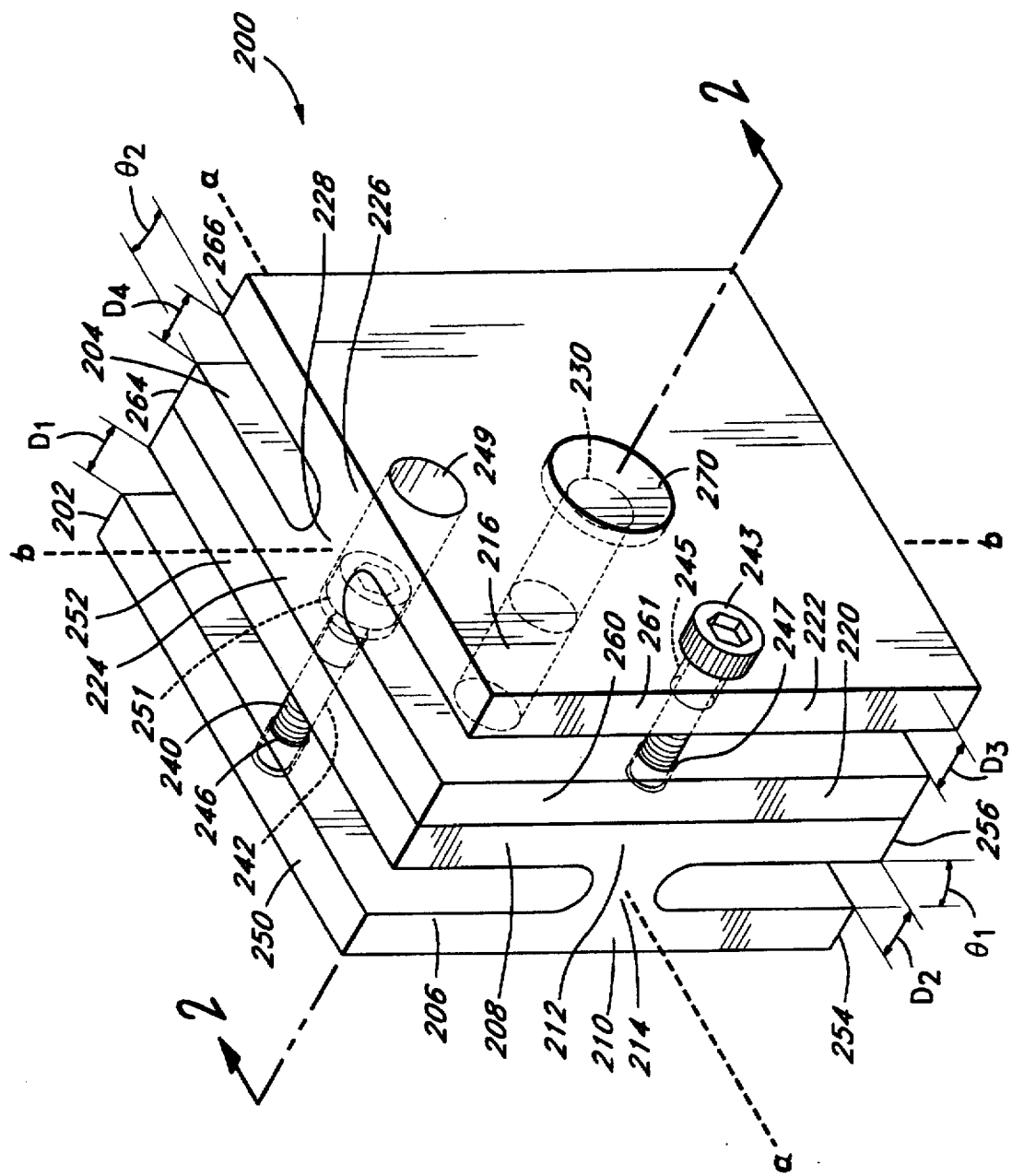
FIG. 1 illustrates a first embodiment of an optical alignment device embodying various features of the present invention for aligning an optical element.
Figure 2:
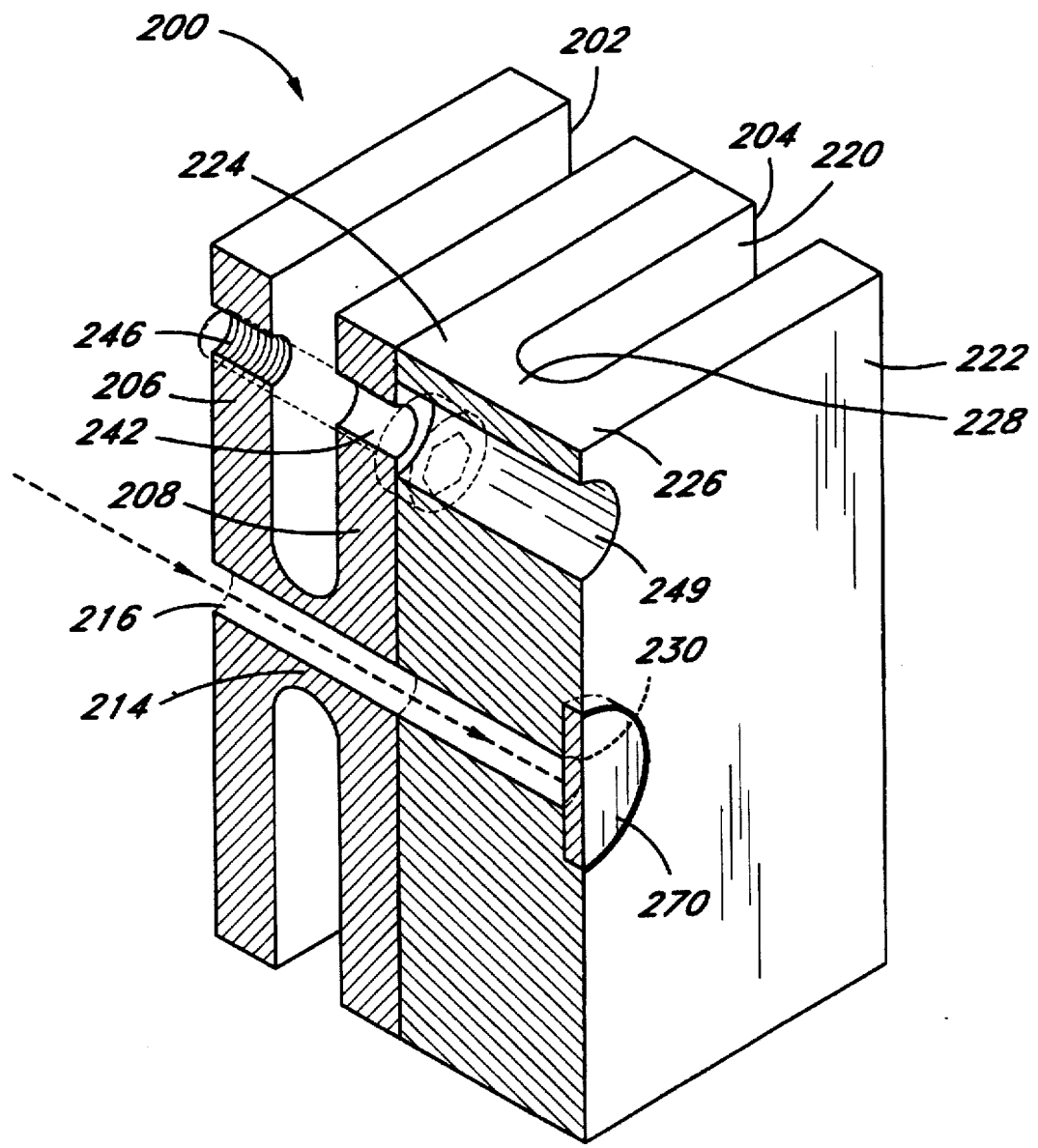
FIG. 2 illustrates a cross-section of the first embodiment of the optical alignment device of FIG. 1 taken along line 2—2.
Figure 3:
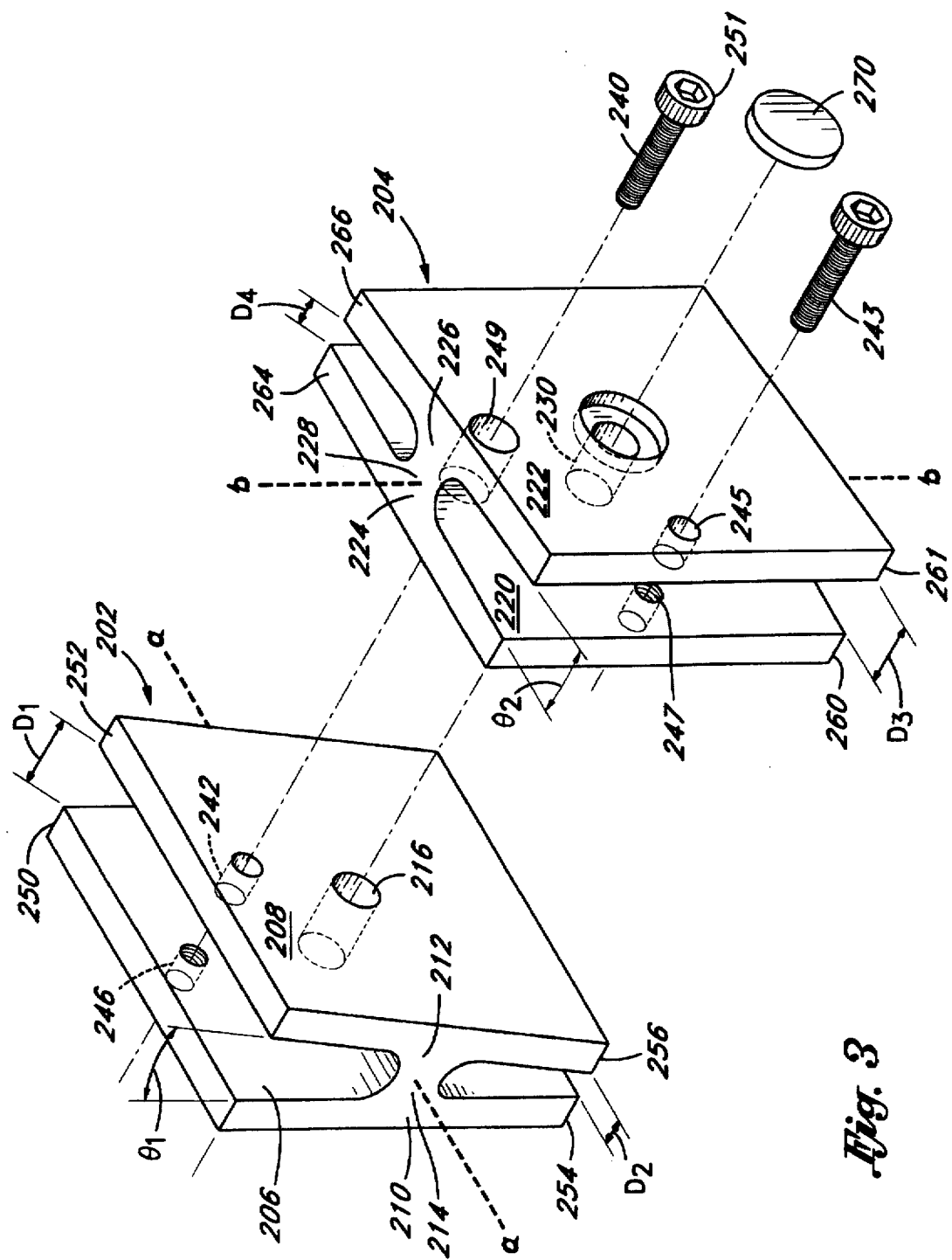
FIG. 3 illustrates an exploded assembly view of the first embodiment of the optical alignment device shown in FIGS. 1 and 2.

Referring now to FIGS. 1, 2 and 3, there is illustrated a first embodiment of a precision optical alignment device 200 which includes two orthogonally oriented "H" shaped, resilient web structures 202 and 204 mounted together. Web structure 202 has two generally planar flanges 206 and 208 extending from opposed ends 210 and 212 of a center web 214. The resiliency of the web structure 202 allows the flanges 206 and 208 to be angularly displaced with respect to each other about a flexure axis a—a, but with minimal bending of the flanges 206 and 208. The flexure axis a—a is generally coincident with the centroidal axis of the web 214 between the flanges 206 and 208. An aperture 216 extends through the two flanges 206 and 208, and web 214. Web structure 204, similar in construction to web structure 202, has two generally planar flanges 220 and 222 extending from opposed ends 224 and 226 of a center web 228. Like center web 214, the resiliency of the center web 228 allows the flanges 220 and 222 to be angularly displaced with respect to each other about a flexure axis b—b, but with minimal bending of the flanges 220 and 222. The flexure axis b—b is generally coincident with the centroidal axis of the web 228 between the flanges 220 and 222. An aperture 230 extends through the two flanges 220 and 222, and web 228.

The web structures 202 and 204 may be manufactured, as for example, by being molded, machined, or extruded from materials such as plastic, metal (e.g., aluminum), or composites.

The web structures 202 and 204 preferably are mounted together so that the flexure axes a—a and b—b of center webs 214 and 228, respectively, are orthogonally oriented, and so that the apertures 216 and 230 collectively form an optical cavity through which optical energy may propagate. The web structures 202 and 204 may be affixed to each other using techniques such as adhesive bonding, ultrasonic welding, welding, or by using mechanical fasteners such as screws or rivets, not shown.

A threaded element, such as a screw 240 fitted through aperture 242 of flange 208 and through an aperture 249 in web structure 204 is coaxially aligned with a threaded hole 246 formed in flange 206. The threaded element 240 threadably engages the threaded hole 246. Likewise, a threaded element 243 fitted through aperture 245 in flange 222 threadably engages threaded hole 247 formed in flange 220. Threaded hole 247 formed in flange 220 of web structure 204 is coaxially aligned with aperture 245 extending through flange 222 of web structure 204. The aperture 249 formed through the web structure 204 has a greater diameter than the outside diameter of head 251 of threaded element 240, thereby facilitating manipulation of threaded element 240 within threaded hole 246 of flange 206 when the web structures 202 and 204 are assembled together. By way of example, the threaded elements 240 and 243 may be implemented as Allen™ or Torx™ head screws.

In an unstressed, unflexed state (see FIG. 3), flange ends 250 and 252 of the flanges 206 and 208, respectively, through which the threaded element 240 is fitted, are separated by a distance $D_1$. In such unstressed state, ends 254 and 256 of the flanges 206 and 208, respectively, are separated by a distance $D_2$, where preferably $D_2<D_1$ so that the flanges 206 and 208 define a normally nonparallel angle, $\theta_1$, preferably in the range of 1 to 15 degrees, between themselves. As a result of such angle, rotation of the threaded element 240 in one direction draws flange ends 250 and 252 together to induce a preload force, or tension in threaded element 240. Such tension minimizes backlash between the threaded element 240 and the flanges 206 and 208, and serves to maintain the angular relation between the flanges. The preload force is due to the elastic (resilient) deformation induced in the web 214 about the flexure axis a—a when the web is flexed. Rotation of the threaded element 240 in the opposite direction causes the bending stress induced in web 214 to be reduced, thereby allowing the distance $D_1$ to increase.

Similarly, in an unstressed, unflexed state (see FIG. 3), flange ends 260 and 261 of the flanges 220 and 222, respectively, through which a threaded element 243 is fitted, are normally separated in an unstressed state by a distance $D_3$. Opposite ends 264 and 266 of flanges 220 and 222, respectively, are separated by a distance $D_4$, where preferably $D_4<D_3$ so that the flanges define a normally nonparallel angle, $\theta_2$, preferably in the range of 1–15 degrees, with respect to each other. As a result of the angle, rotation of the threaded element 243 in one direction draws the flange ends 260 and 261 together and provides a preload force which places the threaded element 262 in tension. The preload force is due to the elastic deformation induced in the web 228 about the flexure axis b—b. Such tension minimizes backlash between the threaded element and the flanges 220 and 222 and serves to maintain the angular relation between the flanges. Rotation of the threaded element 243 in the opposite direction causes the bending stress induced in web 228 to be reduced, thereby allowing the distance $D_3$ to increase.

An optical element 270, for example a mirror, may be mounted to flange 222 over aperture 230 by means well known in the art. The optical alignment device 200 may be mounted to some structure, such as an optical resonant cavity, not shown, so that the optical cavity defined by apertures 216 and 230 generally aligns with the optical axis of the structure. Then, manipulation of threaded elements 240 and 243 may be employed to more precisely adjust the position of the optical element 270 in mutually perpendicular directions. Such adjustment may be employed to very precisely align the optical element 270 in two orthogonal directions as desired within the adjustment limits of the device 200.

Figure 4:
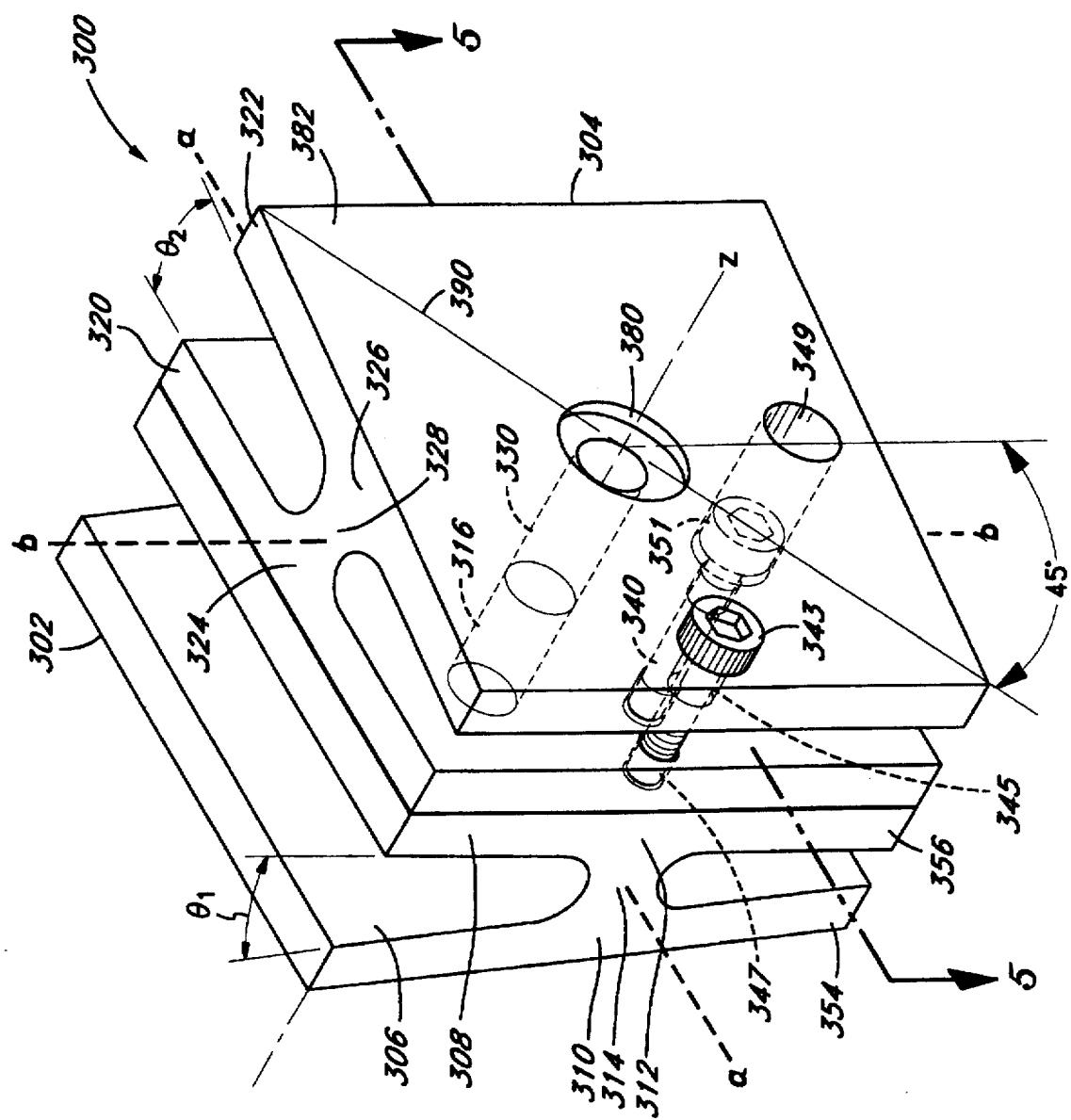
FIG. 4 illustrates a second embodiment of an optical alignment device embodying various features of the present invention for aligning an optical element.

Referring now to FIGS. 4, 5 and 6, there is illustrated a second embodiment of a precision optical alignment device 300 which includes two orthogonally oriented "H" shaped, resilient web structures 302 and 304 mounted together. Web structure 302 has two generally planar flanges 306 and 308 extending from opposed ends 310 and 312 of a center web 314. The resiliency of the web structure 302 allows the flanges 306 and 308 to be angularly displaced with respect to each other about a flexure axis a—a, but with minimal bending of the flanges 306 and 308. The flexure axis a—a is generally coincident with the centroidal axis of the web 314 between the flanges 306 and 308. An aperture 316 extends through the two flanges 306 and 308, and web 314. Web structure 304, similar in construction to web structure 302, has two generally planar flanges 320 and 322 extending from opposed ends 324 and 326 of a center web 328. Like center web 314, the resiliency of the center web 328 allows the flanges 320 and 322 to be angularly displaced with respect to each other about a flexure axis b—b, but with minimal bending of the flanges 320 and 322. The flexure axis b—b is generally coincident with the centroidal axis of the web 328 between the flanges 320 and 322. An aperture 330 extends through the two flanges 320, 322 and web 328. An optical element mounting surface 380 is formed in a substantially planar surface 382 of flange 322 over aperture 330. The optical element mounting surface 380 includes a substantially planar surface which is not parallel to the substantially planar surface 382 of flange 322. For purposes of describing the orientation of the substantially planar surface 382 of flange 322 with respect to the substantially planar optical element mounting surface 380, an X-Y-Z coordinate system is shown FIG. 6 wherein the X-Y plane of the X-Y-Z coordinate system coincides with the substantially planar surface 382 of the flange 322. When the flanges 306, 308, 320 and 322 are in parallel alignment (i.e., the unstressed state shown in FIG. 6), the X-axis of the X-Y coordinate system is substantially parallel to the a—a flexure axis; the Y-axis is substantially parallel to the b—b flexure axis; and the flanges 306, 308, 320 and 322 each lies in a plane which is substantially parallel to the X-Y plane and perpendicular to the Z-axis of the X-Y-Z coordinate system. Additionally, the substantially planar optical element mounting surface 380 and the substantially planar surface 382 of the flange 322 intersect along a line 390 which forms a 45 degree angle with the X-axis and a 45 degree angle with the Y-axis. Thus, in the unstressed state (see FIG. 6) the substantially planar optical element mounting surface 380 is not perpendicular to the Z-axis and the substantially planar surface 382 is substantially perpendicular to the Z-axis. Similarly, in the stressed state (see FIGS. 4 and 5) the substantially planar optical element mounting surface 380 is substantially perpendicular to the Z-axis and the substantially planar surface 382 is not perpendicular to the Z-axis.

The web structures 302 and 304 may be manufactured, as for example, by being molded, machined, or extruded from materials such as plastic, metal (e.g., aluminum), or composites.

The web structures 302 and 304 preferably are mounted together so that the flexure axes a—a and b—b of center webs 314 and 328, respectively, are orthogonally oriented, and so that the apertures 316 and 330 collectively form an optical cavity through which optical energy may propagate. The web structures 302 and 304 may be affixed to each other using techniques such as adhesive bonding, ultrasonic welding, welding, or by using mechanical fasteners such as screws or rivets, not shown.

A threaded element, such as a screw 340 fitted through aperture 342 of flange 308 and through an aperture 349 in web structure 304 is coaxially aligned with a threaded hole 346 formed in flange 306. The threaded element 340 threadably engages the threaded hole 346. Likewise, a threaded element 343 fitted through aperture 345 in flange 322 threadably engages threaded hole 347 formed in flange 320. Threaded hole 347 formed in flange 320 of web structure 304 is coaxially aligned with aperture 345 extending through flange 322 of web structure 304. The aperture 349 formed through the web structure 304 has a greater diameter than the outside diameter of head 351 of threaded element 340, thereby facilitating manipulation of threaded element 340 within threaded hole 346 of flange 306 when the web structures 302 and 304 are assembled together. By way of example, the threaded elements 340 and 343 may be implemented as Allen™ or Torx™ head screws.

In an unstressed, unflexed state (see FIG. 6), flange ends 350 and 352 of the flanges 306 and 308, respectively, through which the threaded element 340 is fitted, are separated by a distance $D_1$. In such unstressed state, ends 354 and 356 of the flanges 306 and 308, respectively, are separated by a distance $D_2$, where preferably $D_2 \approx D_1$ so that the flanges 306 and 308 are substantially parallel. Rotation of the threaded element 340 in one direction draws flange ends 354 and 356 together to induce a preload force, or tension in threaded element 340 thereby moving flanges 306 and 308 into a nonparallel configuration defining an angle $\theta_1$ (see FIG. 4). Such tension minimizes backlash between the threaded element 340 and the flanges 306 and 308, and serves to maintain the angular relation between the flanges. The preload force is due to the elastic (resilient) deformation induced in the web 314 about the flexure axis a—a when the web is flexed. Rotation of the threaded element 340 in the opposite direction causes the bending stress induced in web 314 to be reduced, thereby allowing the distance $D_1$ to decrease.

Similarly, in an unstressed, unflexed state (see FIG. 6), flange ends 360 and 361 of the flanges 320 and 322, respectively, through which a threaded element 343 is fitted, are normally separated in an unstressed state by a distance $D_3$. Opposite ends 364 and 366 of flanges 320 and 322, respectively, are separated by a distance $D_4$, where preferably $D_4 \approx D_3$ so that the flanges 320 and 322 are substantially parallel. Rotation of the threaded element 343 in one direction draws the flange ends 360 and 361 together and provides a preload force which places the threaded element 343 in tension thereby moving flanges 320 and 322 into a nonparallel configuration defining an angle $\theta_2$, (see FIGS. 4 and 5). The preload force is due to the elastic deformation induced in the web 328 about the flexure axis b—b. Such tension minimizes backlash between the threaded element and the flanges 320 and 322 and serves to maintain the angular relation between the flanges. Rotation of the threaded element 343 in the opposite direction causes the bending stress induced in web 328 to be reduced, thereby allowing the distance $D_3$ to increase.

An optical element 370, for example a mirror, may be mounted to optical element mounting surface 380 over aperture 330 by means well known in the art. The optical alignment device 300 may be mounted to some structure, such as an optical resonant cavity, not shown, so that the optical cavity defined by apertures 316 and 330 generally aligns with the optical axis of the structure. Then, manipulation of threaded elements 340 and 343 may be employed to more precisely adjust the position of the optical element 370 in mutually perpendicular directions. Such adjustment may be employed to very precisely align the optical element 370 in two orthogonal directions as desired within the adjustment limits of the device 300.

Referring now to FIG. 7, there is shown an example of an application of the present invention used in conjunction with an optical resonant cavity 110 for aligning the cavity optics. The optical resonant cavity 110 includes a plasma discharge tube 112 positioned at one end of a plasma tube housing 114 and the precision optical alignment device 200 mounted to the opposite end of the plasma tube housing 114. A first reflector 116 is mounted at one end of the plasma discharge tube 112 and a second reflector 275, mounted to the precision optical alignment device 200, is optically aligned with the first reflector 116. The distance between the first reflector 116 and second reflector 275 define the length of the optical resonant cavity 110. A Brewster window 117 may preferably be mounted at the end of the plasma discharge tube 112 opposite the first reflector 116 so as to be interposed between the first and second reflectors 116 and 275, respectively. A gas mixture, not shown, capable of lasing is confined within the plasma discharge tube 112. Optical energy in the form of an optical beam 120 is output by the plasma discharge tube 112 through the Brewster window 117 and resonates between the reflectors 116 and 275. The Brewster window 117 may be employed to select a particular wavelength and polarization state of optical beam 120. Alignment of the reflectors 116 and 275 may accomplished by adjusting the threaded elements 240,243 of the precision optical alignment device 200, shown in FIGS. 1–3.

The reflectors 116 and 275, and Brewster window 117 each may be categorized as an optical element, i.e., a structure that, for example, reflects, refracts, filters, and/or changes the polarization state of an optical beam.

Referring to FIG. 8, there is shown another application of the precision optical element alignment system 200 in conjunction with a Raman gas analysis system of the type described in U.S. patent application Ser. No. 08/366,840, entitled "RAMAN GAS ANALYSIS SYSTEM WITH PRECISION OPTICAL ALIGNMENT FEATURES", incorporated in its entirety herein by reference. The resonant cavity includes a plasma discharge tube 16 fitted in one end of a plasma tube housing 120, and a gas analysis cell 10 mounted between the other end of the plasma tube housing 120 and the precision optical alignment device 200. A first reflector 18 is mounted at one end of the plasma discharge tube 16 and is optically aligned with the second reflector 275 mounted to the precision optical alignment device 200. The resonant cavity has a length defined by the distance between the first reflector 18 and second reflector 275. Each of the reflectors 18 and 275 is preferably a high reflectivity mirror having a reflectivity greater than 99.9%. A lasting gas mixture capable of lasing is confined within the plasma discharge tube 16 and a Brewster window 22 is positioned at the end of the plasma discharge tube 16 adjacent to the output such that the light beam propagating within the cavity enters and exits the plasma discharge tube 16 through the Brewster window 22. Alignment of the reflectors 18 and 275 may be accomplished by suitable adjustment of the threaded elements 240,243 of the precision optical alignment device 200, shown in FIGS. 1–3.

While the applications shown and described in reference to FIGS. 7 and 8 show the first embodiment of the precision optical alignment device 200 (FIGS. 1-3) of the present invention, it is to be understood that the second embodiment of the precision optical alignment device 300 (FIGS. 4-6) of the present invention may be substituted for the first embodiment. Thus, the first and second embodiments are completely interchangeable.

In light of these teachings, numerous other embodiments of the invention may become obvious to one skilled in the art. Thus, the system and method of the present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. An optical alignment device comprising:
a first "H" shaped web structure comprising: first and second flanges extending from a first web having a first flexure axis; a first aperture extending through said first "H" shaped web structure; and a first adjusting element connecting said first and second flanges such that operation of said first adjusting element produces an angular displacement about said first flexure axis of said first flange with respect to said second flange; and
a second "H" shaped web structure comprising: third and fourth flanges extending from a second web having a second flexure axis; a second aperture extending through said second "H" shaped web structure; and a second adjusting element connecting said third and fourth flanges such that operation of said second adjusting element produces an angular displacement about said second flexure axis of said third flange with respect to said fourth flange; wherein said first and second "H" shaped web structures are joined together such that said first and second flexure axes are substantially perpendicular and said first and second apertures are substantially aligned.

2. The optical alignment device of claim 1 wherein said first and second adjusting elements are screws.

3. The optical alignment device of claim 1 wherein said first and second flanges define a first nonparallel angle when said first "H" shaped structure is in an unflexed state.

4. The optical alignment device of claim 3 wherein said first nonparallel angle is in the range of from one to fifteen degrees.

5. The optical alignment device of claim 3 wherein said third and fourth flanges define a second nonparallel angle when said second "H" shaped structure is in an unflexed state.

6. The optical alignment device of claim 1 wherein said first and second "H" shaped structures are each monolithic structures.

7. The optical alignment device of claim 6 wherein said first and second "H" shaped structures are substantially identical extruded structures.

8. The optical alignment device of claim 1 wherein said first and second adjusting elements are in tension.

9. The optical alignment device of claim 1 further including an optical element mounted to said first "H" shaped web structure in optical alignment with said first aperture.

10. The optical alignment device of claim 1 wherein said first and second flanges are substantially parallel when said first "H" shaped structure is in an unflexed state and one of said first or second flanges further includes an optical mounting surface which is non-parallel to said first and second flanges.

11. The optical alignment device of claim 10 wherein said third and fourth flanges are substantially parallel when said second "H" shaped structure is in an unflexed state.

12. An optical alignment device comprising:
a first "H" shaped structure comprising: a first web having a first flexure axis and opposed first and second ends; a first flange resiliently extending from said first end of said first web and having a first threaded aperture; a second flange resiliently extending from said second end of said first web and having a second aperture coaxially aligned with said first threaded aperture; a third aperture extending through said first and second flanges and through said first web; and a first threaded member fitted through said second aperture and threaded to said first threaded aperture, whereby rotation of said first threaded member resiliently displaces said first flange with respect to said second flange; and
a second "H" shaped structure comprising: a second web having a second flexure axis and opposed third and fourth ends; a third flange resiliently extending from said third end of said second web, and having a fourth threaded aperture; a fourth flange resiliently extending from said fourth end of said second web, and having a fifth aperture coaxially aligned with said fourth threaded aperture; a sixth aperture extending through said third and fourth flanges and through said second web; and a second threaded member fitted through said fifth aperture and threaded to said fourth threaded aperture, whereby rotation of said second threaded member resiliently displaces said third flange with respect to said fourth flange; wherein said second "H" shaped structure is mounted to said first "H " structure so that said first and second flexure axes are substantially perpendicular and so that said third and sixth apertures are substantially aligned.

13. The optical alignment device of claim 12 wherein said first and second flanges define a nonparallel first angle therebetween when said first "H" shaped structure is in an unflexed state.

14. The optical alignment device of claim 13 wherein said first angle is in the range of from one to fifteen degrees.

15. The optical alignment device of claim 12 wherein said third and fourth flanges define a nonparallel second angle therebetween when said second "H" shaped structure is in an unflexed state.

16. The optical alignment device of claim 15 wherein said second angle is in the range of from one to fifteen degrees.

17. The optical alignment device of claim 12 wherein said first and second threaded members are screws.

18. The optical alignment device of claim 12 wherein said first and second "H" shaped structures are each monolithic structures.

19. The optical alignment device of claim 12 wherein said first and second "H" shaped structures are extruded structures.

20. The optical alignment device of claim 12 further comprising an optical element mounted to said first "H" shaped structure and substantially optically aligned with said third aperture.

21. The optical alignment device of claim 12 wherein said first and second flanges are substantially parallel when said first "H" shaped structure is in an unflexed state and one of said first or second flanges further includes an optical mounting surface which is non-parallel to said first and second flanges.

22. The optical alignment device of claim 21 wherein said third and fourth flanges are substantially parallel when said second "H" shaped structure is in an unflexed state.

23. A Raman gas analysis system comprising:

a plasma discharge tube having a first reflector at a first end;

an optical alignment device which supports an optical element optically aligned with said first reflector, said optical alignment device comprising:
 a first "H" shaped web structure including: first and second flanges extending from a first web having a first flexure axis; a first aperture extending through said first and second flanges and through said first web; and a first threaded element engaged with said first "H" shaped web structure so that rotating said first threaded element angularly displaces said first flange with respect to said second flange; and
 a second "H" shaped web structure including: third and fourth flanges extending from a second web having a second flexure axis; a second aperture extending through said third and fourth flanges and through said second web; and a second threaded element engaged with said second "H" shaped web structure so that rotating said second threaded element angularly displaces said third flange with respect to said fourth flange; wherein said first and second "H" shaped web structures are mounted together so that said first and second flexure axes are substantially perpendicular, and said first and second apertures are substantially aligned; and a gas analysis cell mounted between said plasma discharge tube and said optical alignment device.

24. The Raman gas analysis system of claim 23 wherein said optical element is a reflector.

25. An optical alignment device comprising:
 a first "H" shaped web structure comprising:
  first and second flanges extending from a first web having
  a first flexure axis; and
  a first adjusting element connecting said first and second flanges such that operation of said first adjusting element produces an angular displacement about said first flexure axis of said first flange with respect to said second flange; a second "H" shaped web structure comprising:
  third and fourth flanges extending from a second web having a second flexure axis; and
  a second adjusting element connecting said third and fourth flanges such that operation of said second adjusting element produces an angular displacement about said second flexure axis of said third flange with respect to said fourth flange;
 wherein said first and second "H" shaped web structures are joined together such that said first and second flexure axes are substantially perpendicular.

26. The optical alignment device of claim 25 wherein said first and second flanges define a first nonparallel angle when said first "H" shaped structure is in an unflexed state and said third and fourth flanges define a second nonparallel angle when said second "H" shaped structure is in an unflexed state.

27. The optical alignment device of claim 25 wherein said first and second "H" shaped structures are substantially identical extruded structures.

28. The optical alignment device of claim 25 wherein said first and second flanges are substantially parallel when said first "H" shaped structure is in an unflexed state and one of said first or second flanges further includes an optical mounting surface which is non-parallel to said first and second flanges.

29. The optical alignment device of claim 28 wherein said third and fourth flanges are substantially parallel when said second "H" shaped structure is in an unflexed state.

* * * * *